(12) United States Patent
Smith et al.

(10) Patent No.: US 11,573,154 B2
(45) Date of Patent: Feb. 7, 2023

(54) SYSTEM AND METHOD FOR ESTIMATING RING-RELATED PARAMETERS

(71) Applicant: Caterpillar Inc., Peoria, IL (US)

(72) Inventors: Thomas Ryan Smith, Peoria Heights, IL (US); Bradley Morgan, Chillicothe, IL (US); Mark Wayne Jarrett, Washington, IL (US); Srikanth Katakam, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 172 days.

(21) Appl. No.: 16/713,595

(22) Filed: Dec. 13, 2019

(65) Prior Publication Data

US 2021/0181061 A1   Jun. 17, 2021

(51) Int. Cl.
  *G01M 15/04* (2006.01)
  *G01B 21/32* (2006.01)
  *F02B 77/08* (2006.01)
(52) U.S. Cl.
  CPC ......... *G01M 15/042* (2013.01); *F02B 77/085* (2013.01); *G01B 21/32* (2013.01); *F02B 77/089* (2013.01)
(58) Field of Classification Search
  CPC ...... F02B 77/085; F02B 77/089; G01B 21/32; G01M 15/042
  See application file for complete search history.

(56) References Cited

U.S. PATENT DOCUMENTS

| 5,675,076 A | 10/1997 | Esch et al. |
| 6,889,541 B1 | 5/2005 | Kang |
| 8,433,495 B2 | 4/2013 | Shieh et al. |
| (Continued) | | |

FOREIGN PATENT DOCUMENTS

| CN | 106555699 A | 4/2017 |
| JP | 4723202 B2 | 7/2011 |

OTHER PUBLICATIONS

Delprete et al., Gas escape to crankcase: impact of system parameters on sealing behavior of a piston cylinder ring pack, IJEEE, Mar. 11, 2019 (Year: 2019).*

(Continued)

*Primary Examiner* — Kyle R Quigley
(74) *Attorney, Agent, or Firm* — Lee & Hayes, P.C.

(57) ABSTRACT

A method for estimating at least one ring-related parameter related to at least one piston ring may include estimating a bore distortion of a cylinder bore. The bore distortion may include a plurality of bore distortions corresponding to a plurality of respective piston locations within the cylinder bore. The method may also include receiving the bore distortion in a ring performance model configured to dynamically estimate a plurality of ring-related parameters associated with combustion in the cylinder bore during operation of the internal combustion engine. The ring performance model may be configured to receive a static data signal indicative of static parameters and a dynamic data signal indicative of dynamic parameters related to operation of the internal combustion engine. The ring performance model may be configured to estimate at least one ring-related parameter related to at least one piston ring during operation of the internal combustion engine.

20 Claims, 7 Drawing Sheets

(56) References Cited

U.S. PATENT DOCUMENTS

2013/0218535 A1* 8/2013 Shieh ..................... G06F 30/15
  703/2
2018/0230935 A1* 8/2018 Ali ........................ F02F 7/0095
2018/0283309 A1* 10/2018 Kamat ............... B22D 19/0009

OTHER PUBLICATIONS

Selmani et al., Simulation of the cylinder bore distortion and effect on the sealing capacity of the ringpack, Springer Nature, Mar. 7, 2019 (Year: 2019).*
Mavrigian, Cylinder Bore Distortion, Engine Professional 2010 (Year: 2010).*
Drossel, An adaptronic system to control shape and surface of liner bores during the honing process, CIRP 2013 (Year: 2013).*
Selmani et al., "Simulation of the Cylinder Bore Distortion and Effect on the Sealing Capacity of the Ringpack", SN Applied Sciences; Mar. 7, 2019, 10 pages.

* cited by examiner

SYSTEM AND METHOD FOR ESTIMATING RING-RELATED PARAMETERS

TECHNICAL FIELD

The present disclosure relates to a system and method for estimating ring-related parameters, and more particularly, to a system and method for estimating ring-related parameters during operation of an internal combustion engine.

BACKGROUND

Internal combustion engines combust fuel and air to produce power. For example, in a reciprocating-piston internal combustion engine, the internal combustion engine may include a block defining one or more cylinder bores in each of which a piston may reciprocate during operation of the internal combustion engine. The piston and a cylinder head may define a combustion chamber into which air and fuel may be supplied, combusted, and exhausted following combustion. The piston is coupled to a crankshaft, and combustion may force the piston down the cylinder bore resulting in torque being supplied to the crankshaft, which may be used to supply power for performing work. During repetition of this process, the piston may reciprocate within the cylinder bore. In order to improve the efficiency and reduce undesired emissions, one or more piston rings may be coupled to the piston to improve a sliding seal between the piston and a surface of the cylinder bore. When evaluating operation of an internal combustion engine, it may be desirable to evaluate the performance of the one or more piston rings, for example, during simulated operation of the internal combustion engine. However, some evaluations of operation of the internal combustion may lack sophistication sufficient to provide accurate results with respect to the one or more piston rings, reducing the value of the evaluation.

An attempt to provide a method for determining a blow-by gas species concentration is described in U.S. Pat. No. 8,433,495 B2 to Shieh et al. ("the '495 patent"), issued Apr. 30, 2013. Specifically, the '495 patent describes a method for determining a blow-by gas species concentration including calculating one-dimensional engine performance data with a one-dimensional engine performance model. According to the '495 patent, the one-dimensional engine performance data may be based at least in part upon an engine operating condition, and the one-dimensional engine performance data may be transformed, automatically with a processor executing a two-dimensional ring dynamics model, into piston ring motion data. According to the '495 patent, the two-dimensional ring dynamics model simulates geometrical changes to a piston-ring pack flow path. The blow-by gas species concentration may be determined with a network model including the one-dimensional engine performance model and a two-dimensional ring pack model. According to the '495 patent, the two-dimensional ring pack model simulates species concentration change in the piston-ring pack flow path, and the '495 patent purports to determine the blow-by gas species concentration using the engine operating condition and the piston ring motion data.

Although the '495 patent purports to describe a two-dimensional ring dynamics model that simulates geometrical changes to a piston-ring pack flow path, the '495 patent may suffer from inaccuracies due to a failure to accurately account for cylinder bore distortion. The systems and methods described herein may be directed to addressing one or more of the possible concerns set forth above.

SUMMARY

A first aspect may include a computer-implemented method for estimating at least one ring-related parameter related to at least one piston ring during operation of an internal combustion engine. The internal combustion engine may include a cylinder block defining at least one cylinder bore having a cross-sectional shape and a cross-sectional size in a direction substantially perpendicular to a longitudinal axis of the cylinder bore. The method may include estimating a bore distortion indicative of differences between the cross-sectional shape and the cross-sectional size of the cylinder bore and an operational cross-sectional shape and an operational cross-sectional size of the cylinder bore during operation of the internal combustion engine. The bore distortion may include a plurality of bore distortions corresponding to a plurality of respective piston locations within the cylinder bore during operation of the internal combustion engine. The method may also include receiving the bore distortion in a ring performance model configured to dynamically estimate a plurality of ring-related parameters associated with combustion in the cylinder bore during operation of the internal combustion engine. The ring performance model may be configured to receive a bore distortion signal indicative of the bore distortion, receive a static data signal indicative of static parameters related to the internal combustion engine, and receive a dynamic data signal indicative of dynamic parameters related to operation of the internal combustion engine. The ring performance model may also be configured to estimate at least one ring-related parameter related to at least one piston ring during operation of the internal combustion engine based at least in part on at least one of the bore distortion, the static parameters, or the dynamic parameters.

A further aspect is directed to a computer-readable storage medium having computer-executable instructions stored thereupon which, when executed by a computer, cause the computer to estimate a bore distortion indicative of differences between a cross-sectional shape and a cross-sectional size of a cylinder bore of an internal combustion engine and an operational cross-sectional shape and an operational cross-sectional size of the cylinder bore during operation of the internal combustion engine. The computer may be further caused to receive a bore distortion signal indicative of the bore distortion, receive a static data signal indicative of static parameters related to the internal combustion engine, and receive a dynamic data signal indicative of dynamic parameters related to operation of the internal combustion engine. The computer may be further caused to estimate at least one ring-related parameter associated with combustion in the cylinder bore during operation of the internal combustion engine based at least in part on at least one of the bore distortion, the static parameters, or the dynamic parameters.

According to another aspect, a system for estimating at least one ring-related parameter related to at least one piston ring during operation of an internal combustion engine may include at least one processor configured to cause execution of a ring performance model configured to dynamically estimate at least one ring-related parameter related to at least one piston ring during operation of an internal combustion engine. The ring performance model may be configured to receive a bore distortion signal indicative of bore distortion and estimate a bore distortion indicative of differences between a cross-sectional shape and a cross-sectional size of a cylinder bore of an internal combustion engine and an operational cross-sectional shape and an operational cross-sectional size of the cylinder bore during operation of the internal combustion engine. The bore distortion may include a plurality of bore distortions corresponding to a plurality of respective piston locations within the cylinder bore during operation of the internal combustion engine. The ring performance model may be further configured to receive a static data signal indicative of static parameters related to the internal combustion engine, receive a dynamic data signal indicative of dynamic parameters related to operation of the internal combustion engine, and estimate at least one ring-related parameter related to at least one piston ring during operation of the internal combustion engine based at least in part on at least one of the bore distortion, the static parameters, or the dynamic parameters.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

The present disclosure is generally directed to systems and methods for estimating one or more ring-related parameters related to one or more piston rings during operation of an internal combustion engine. Ring-related parameters may include, but are not limited to, ring friction, ring wear, blowby, oil consumption, and/or forces to which the rings are subjected during operation of the internal combustion engine. In some examples, the ring-related parameters may be estimated using a computer-based model. The internal combustion engine, simulated or actual, may include a cylinder block defining one or more cylinder bores having a cross-sectional shape and a cross-sectional size in a direction substantially perpendicular to a longitudinal axis of the cylinder bore. In some examples, the cross-sectional size and the cross-sectional shape of the cylinder bore may define in the longitudinal direction, in a substantially undistorted condition, a substantially cylindrical inward-facing surface. During operation of an internal combustion engine, the one or more cylinder bores may distort, resulting in differences between the cross-sectional shape and the cross-sectional size of the cylinder bore (e.g. in a substantially undistorted condition) and an operational cross-sectional shape and an operational cross-sectional size of the cylinder bore during operation of the internal combustion engine, for example, as modeled by a computer-based model. Such distortion of the cylinder bore may affect one or more of the ring-related parameters estimated according to at least some examples of the systems and methods described herein. In some examples, the systems and methods may be used to estimate a bore distortion indicative of differences between the cross-sectional shape and the cross-sectional size of the cylinder bore (e.g., in a substantially undistorted condition) and an operational cross-sectional shape and an operational cross-sectional size of the cylinder bore during operation of the internal combustion engine. In some examples, the bore distortion estimation may include a plurality of bore distortions corresponding to a plurality of respective piston locations within the cylinder bore during operation of the internal combustion engine. Estimating the bore distortion according to at least some examples described herein may result in improved accuracy of the estimation of the one or more ring-related parameters.

Figure 1:
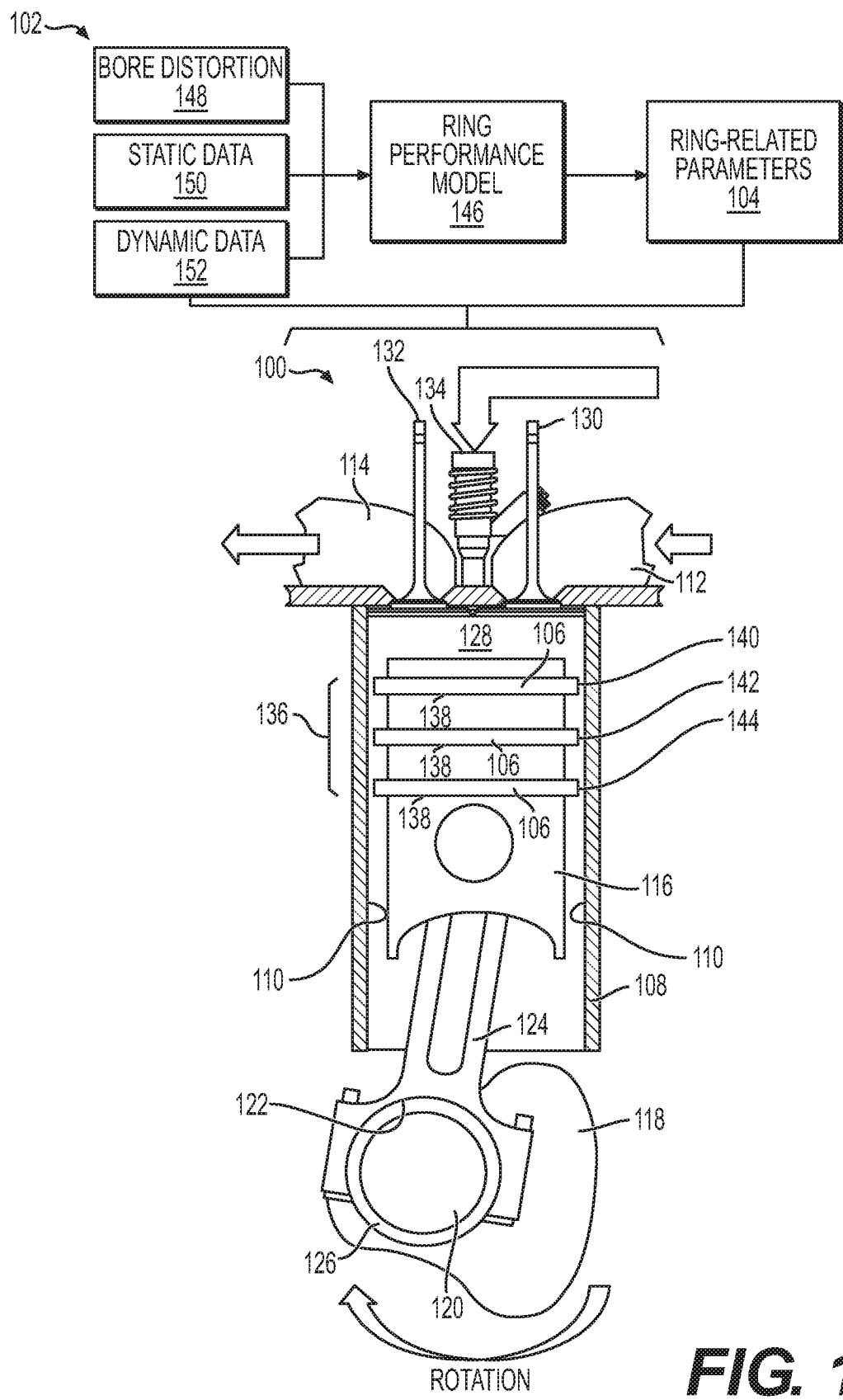
FIG. 1 is a partial schematic end section view of an example internal combustion engine and a block diagram of an example system for estimating one or more ring-related parameters related to one or more piston rings during operation of the internal combustion engine.

FIG. 1 is a partial schematic end section view of an example internal combustion engine 100 and a block diagram of an example system 102 for estimating one or more ring-related parameters 104 related to one or more piston rings 106 during operation of the internal combustion engine 100. The example partial internal combustion engine 100 shown in FIG. 1 is merely an example, and the internal combustion engine 100 may be a compression-ignition engine, a spark-ignition engine, a homogeneous-charge compression ignition engine, a two-stroke engine, a four-stroke, a six-stroke engine, or any type of internal combustion engine known to those skilled in the art.

The example internal combustion engine 100 shown FIG. 1 includes a cylinder block 108 defining an example cylinder bore 110 defining a longitudinal axis X Although FIG. 1 shows a single cylinder bore 110, it is contemplated that the internal combustion engine 100 may have a single or multiple cylinder banks, each including single or multiple cylinder bores 110. As shown in FIG. 1, the internal combustion engine 100 may include one or more intake manifolds 112 and one or more exhaust manifolds 114. The intake manifold (s) 112 may be in selective flow communication with one or more of the cylinder bores 110 for providing an air-fuel mixture to each cylinder bore 110 for combustion. A fuel, such as, for example, diesel fuel, gasoline, alcohol, natural gas, mixtures thereof, and/or any known suitable fuel, may be injected into each cylinder bore 110 and combusted therein, for example, in a known manner. The exhaust manifold(s) 114 may be in selective flow communication with one or more of the cylinder bores 110. Some examples of the internal combustion engine 100 may include a turbocharger system in flow communication with the intake manifold 112 and in flow communication with the exhaust manifold 114. A compressor of the turbocharger system may be driven by a turbine in flow communication with the exhaust manifold 114, and may be configured to receive a compressible medium (e.g., such as ambient air) and compress the compressible medium. The compressor may be configured to supply the compressed medium to the intake manifold 112, so that it may be used for combustion in one or more of cylinder bores 110, for example, for increasing the torque output and/or power output of the internal combustion engine 100. Some examples of the internal combustion engine 100 may also include an exhaust gas recirculation (EGR) system, which may be configured to control a mixture of compressed combustion gas received from the compressor of the turbocharger with exhaust gas recirculated from the EGR system and may provide the mixture thereof to intake manifold 112.

During operation of some examples of the internal combustion engine 100, a fuel, such as, for example, diesel fuel, may be injected according to a firing order into the cylinder bore(s) 110 and combusted when a piston 116 disposed within the cylinder bore 110 is at or near a top-dead-center position in the cylinder bore 110. Exhaust gas generated during combustion is permitted to flow (e.g., via opening of an exhaust valve) from a respective cylinder bore 110 to the associated exhaust manifold 114. Exhaust gas within the exhaust manifold 114, in some examples, is permitted to flow to and rotatably drive a turbine wheel of a turbine of a turbocharger system. The turbine, in turn, may rotatably drive compressor of the turbocharger system via a shaft. Thereafter, the exhaust gas may be discharged from the turbine to, in some examples, an exhaust after treatment system configured to reduce particulates and/or undesirable byproducts of the combustion process.

The example internal combustion engine 100 shown in FIG. 1 includes a crankshaft 118 rotatably supported in the cylinder block 108, for example, via one or more bearings coupled to cylinder block 108. The example crankshaft 118 includes a crankpin 120, about which an aperture 122 in a connecting rod 124 is coupled, and which rotates on bearings 126 within the aperture 122 of the connecting rod 124, as the crankshaft 118 rotates though three-hundred-sixty degrees. An end of connecting rod 124 opposite crankpin 120 is rotatably coupled to the piston 116, for example, via a pin. The example cylinder bore 110 shown in FIG. 1 defines an example cylinder surface within which the piston 116 slides and reciprocates during operation of the internal combustion engine 100. In the example shown, the example cylinder bore 110 and the example piston 116 define a combustion chamber 128 that expands and contracts as the piston 116 reciprocates within the cylinder bore 110 during operation of the internal combustion engine 100.

The example internal combustion engine 100 also includes an intake valve 130 configured to open and provide flow communication with the combustion chamber 128 and permit air for combustion to enter the combustion chamber 128 via the intake manifold 112, and to close to substantially seal combustion chamber 128 during the power stroke and/or the compression stroke. The example internal combustion engine 100 may also include an exhaust valve 132 configured to open and provide flow communication between the combustion chamber 128 and the exhaust manifold 114 and to permit combusted air and fuel following combustion to enter the exhaust manifold 114, and to close to substantially seal combustion chamber 128 during the power stroke and/or the compression stroke. The example internal combustion engine 100 also includes a fuel injector 134 configured to selectively supply fuel to the combustion chamber 128, for example, in a substantially atomized form to promote even and/or efficient combustion.

In some examples, the piston 116 may be provided with the one or more piston rings 106 received in respective circumferential grooves 138 on the outer surface of the piston 116, for example, forming a ring pack 136. For example, the internal combustion engine 100 shown in FIG. 1 includes three piston rings 106, including a first piston ring 140, a second piston ring 142, and a third piston ring 144. Other numbers of piston rings 106 are contemplated. One or more of the piston rings 106 may be configured to provide a seal between the combustion chamber 128 and a crankcase of the internal combustion engine 100, which may provide a reservoir for receiving and holding a lubricant, improve heat transfer between the piston 116 and the cylinder block 108 via the cylinder bore 110, promote a proper amount of lubricant between the piston 116 and the cylinder bore 110, and/or promote return of lubricant from a surface of the cylinder bore 110 to the crankcase, for example, by wiping lubricant down the cylinder bore 110 into the crankcase. In the example shown, the first piston ring 140 may be a compression ring, the second piston ring 142 may be a compression/wiper ring, and the third piston ring 144 may be an oil ring. Together, two or more of the piston rings 106 may form the ring pack 136.

During operation, according to some examples, the piston 116 may travel down cylinder bore 110 (e.g., away from the intake valve 130) during an intake stroke, while the intake valve 130 is at least partially open and the exhaust valve 132 is substantially closed (e.g., but not necessarily completely closed), drawing air into the combustion chamber 128 while the crankshaft 118 rotates. When the piston 116 reaches its lowest point of travel down the cylinder bore 110 (e.g., bottom-dead-center), the intake valve 130 may close, and a compression stroke may begin as the piston 116 reverses direction and travels within the cylinder bore 110 back toward the intake valve 130, increasing the pressure in the combustion chamber 128. In some examples, the fuel injector 134 may activate and supply fuel to the combustion chamber 128 as the piston 116 approaches or reaches the top end of its stroke (e.g., top-dead-center) and/or shortly thereafter. In some examples (e.g., when the internal combustion engine 100 is part of a compression-ignition engine), the temperature and/or pressure in the combustion chamber 128 may cause a mixture of fuel and air supplied to the combustion chamber 128 to ignite and combust, with the intake valve 130 and the exhaust valve 132 closed (or substantially closed), substantially commencing a power stroke, during which the piston 116 is forced under pressure in the combustion chamber 128 away from the intake valve 130 and the exhaust valve 132, thereby driving the crankshaft 118 to rotate via its connection to the crankpin 120 of the crankshaft 118. After the piston 116 reaches the end of its downward stroke, the exhaust valve 132 may open, providing flow communication between the combustion chamber 128 and the exhaust manifold 114. As the piston 116 travels toward the exhaust valve 132 during an exhaust stroke, byproducts of combusting the air and fuel are pushed to the exhaust manifold 114. This example cycle may be repeated, thereby generating torque and power.

FIG. 1 shows an example of a partially completed power stroke, during which combustion occurs in the cylinder bore 110. Once combustion commences, the piston 116 and the cylinder bore 110 are subjected to increasing temperature and pressure due to combustion. In addition, the cylinder bore 110 may be subjected to a piston side load. In some instances, fasteners (e.g., bolts) securing different parts of the internal combustion engine 100 together may apply compressive forces against the different parts. For example, a cylinder head may be coupled to the cylinder block 108 via fasteners, and the fasteners may create a compressive force, which may result in a deformation or distortion of the cylinder block 108. In some examples, the changing temperature and pressure and/or the compressive forces of the fasteners may result in distortion of one or more of the cylinder bores 110, for example, as explained herein. Such distortion may adversely affect performance of the internal combustion engine 100 generally, and/or more specifically, the performance of one or more of the piston rings 106. For example, clearance between the one or more piston rings 106 and the cylinder bore 110 may change due to bore distortion (e.g., by increasing and/or decreasing, depending on location), thereby affecting the performance of the one or more piston rings 106, for example, as indicated by the one or more ring-related parameters 104).

As schematically shown in FIG. 1, the one or more ring-related parameters 104 may be estimated (e.g., calculated) using a ring performance model 146, which may be an analytical model configured to estimate one or more ring-related parameters (e.g., ring-related performance parameters) based at least in part on one or more input parameters, which may be indicative of at least some components of a simulated internal combustion engine and/or of an actual internal combustion engine. For example, the ring performance model 146 may be configured to receive a bore distortion 148, for example, one or more bore distortion signals indicative of the bore distortion 148, static data 150 related to the internal combustion engine 100, for example, one or more signals indicative of static parameters related to the internal combustion engine 100, and/or dynamic data 152, for example, one or more signals indicative of dynamic parameters related to operation of the internal combustion engine 100. Based at least partially on one or more of the bore distortion 148, the static data 150, or the dynamic data 152, the ring performance model 146 may be configured to estimate the one or more ring-related parameters 104 related to one or more of the piston rings 106 during operation (e.g., simulated and/or actual operation) of the internal combustion engine 100. For example, the ring-related parameters 104 may include ring friction, ring wear, blowby, oil consumption, and/or at least one ring force acting on one or more of the rings 106.

As explained herein, the bore distortion 148 may be indicative of differences between the cross-sectional shape and the cross-sectional size of the cylinder bore 110 and an operational cross-sectional shape and an operational cross-sectional size of the cylinder bore 110 during operation of the internal combustion engine 100 (e.g., simulated and/or actual operation). In some examples, the bore distortion 148 may include a plurality of bore distortions corresponding to a plurality of respective piston locations within the cylinder bore 110 during operation of the internal combustion engine 100 (e.g., simulated and/or actual operation), for example, as explained herein. The bore distortion 148 may be indicative of differences in the surface of the cylinder bore 110, differences in the surface of a surface coating and/or treatment of the surface at least partially defining the cylinder bore 110, and/or in the surface of a cylinder liner at least partially defining the surface of the cylinder bore 110.

In some examples, the static data 150 may include static parameters, which may include, for example, dimensions of at least one component of the internal combustion engine 100, material-related properties of at least one component of the internal combustion engine 100, and/or lubricant-related properties. For example, the static parameters may include engine geometry (e.g., cylinder bore size (e.g., diameter), stroke (e.g., length of travel of the piston 116), a crankshaft axis-to-cylinder head distance, a length of the connecting rod 124), part numbers, material properties of the piston 116 and/or the cylinder bore 110 surface (e.g., modulus of elasticity and/or density), material properties of one or more of the rings 106 (e.g., modulus of elasticity, density, coefficient of thermal expansion, and/or hardness), lubricant properties (e.g., type and/or viscosity), piston distortion, a mass of one or more of the rings 106, and/or measured end gaps. Other static parameters are contemplated.

In some examples, the dynamic data 152 may include dynamic parameters, which may include, for example, operating conditions associated with operation of the internal combustion engine 100 and/or at least one of pressure or temperature associated with operation of the internal combustion engine 100. For example, the dynamic parameters may include engine operating conditions (e.g., rotational speed, rating, application, and/or load), cylinder pressure trace, and/or piston temperature. Other dynamic parameters are contemplated. Such dynamic parameters may be measured and/or calculated in real-time, may be accessed from a database, and/or may be simulated via computer modeling.

Figure 2:
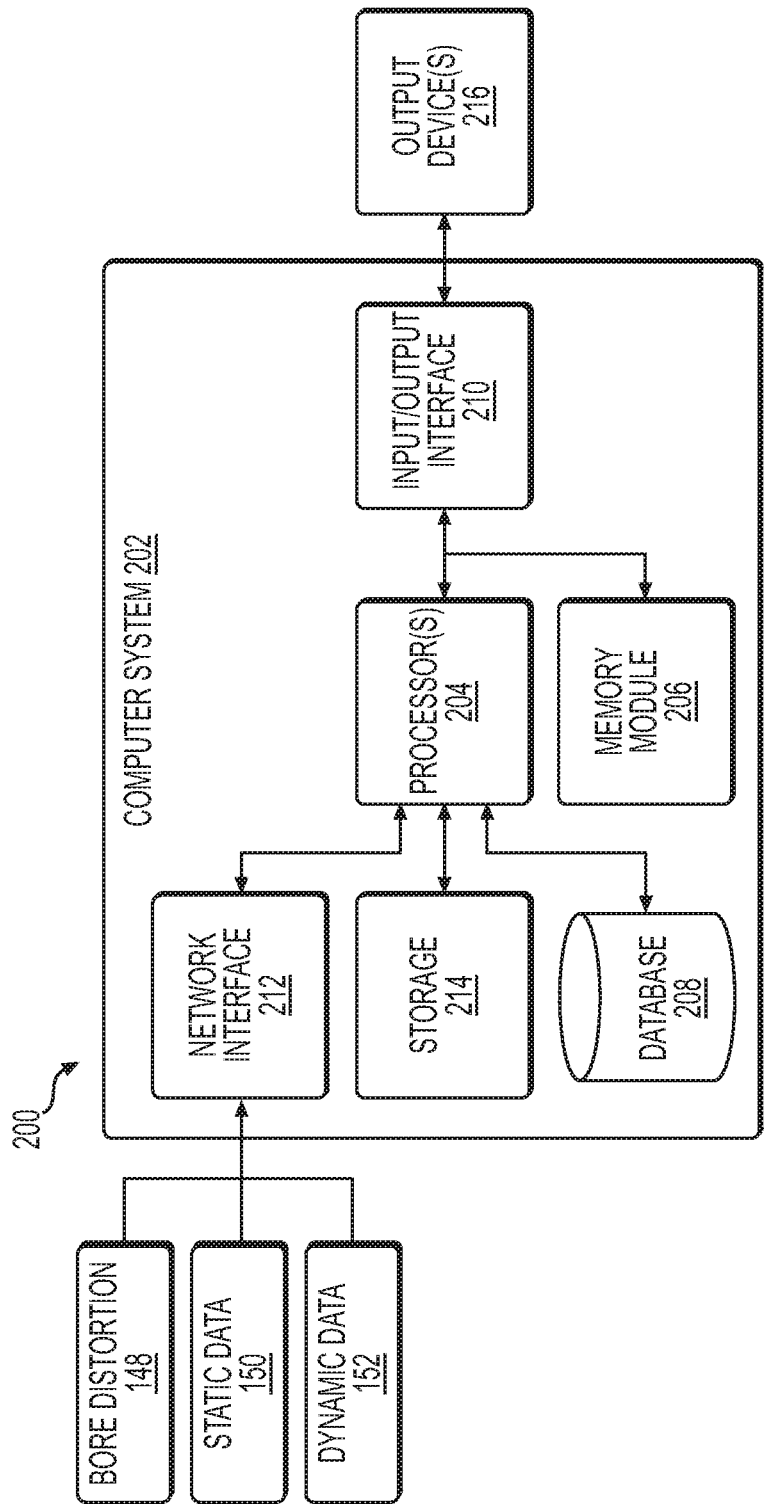
FIG. 2 is a block diagram of an example architecture for an example computer system consistent with example systems and methods described herein.

FIG. 2 is a block diagram of an example architecture 200 for an example computer system 202 consistent with example systems and methods described herein. As shown in FIG. 2, the example computer system 202 (e.g., which be used to execute one or more analytical models for estimating bore distortion 148 and/or for estimating at least one ring-related parameter 104, etc. (FIG. 1)) may include one or more processor(s) 204, a memory module 206, a database 208, an input/output interface 210, a network interface 212, and/or storage 214. The computer system 202 may include fewer, additional, and/or other components.

The example processor(s) 204 may include any appropriate type of general purpose microprocessor, digital signal processor, or microcontroller. The memory module 206, in some examples, may include one or more memory devices including, but not limited to, a read-only memory (ROM), a flash memory, a dynamic random-access memory (RAM), and/or a static RAM. The memory module 206, in some examples, may be configured to store information, which may be used by the processor(s) 204. In some examples, the database 208 may include any type of appropriate database including information related to, for example, characteristics of measured parameters, sensing parameters, mathematical models and/or thermodynamic models, and/or any other information related to control and/or analysis of operation of internal combustion engine 100.

In addition, the input/output interface 210 may be configured to receive data from various sensors (e.g., physical sensors and/or virtual sensors associated with a virtual sensor network), and/or to transmit data to such components. The network interface 212, in some examples, may include any appropriate type of network device capable of communicating with other computer systems, for example, based on one or more wired or wireless communication protocols. In some examples, the storage 214 may include any appropriate type of mass storage configured to store any type of information that the processor(s) 204 may access for operation. For example, the storage 214 may include one or more hard disk devices, optical disk devices, and/or other storage devices to provide storage space. Any or all of the components of example computer system 202 may be implemented and/or integrated into an application-specific-integrated-circuit (ASIC) and/or field-programmable-gate-array (FPGA) device.

As shown in FIG. 2, the input/output interface 210 may be in communication with one or more output device(s) 216 for providing one or more ring-related parameters 104, for example, as described herein. The output device(s) 216 may be configured to display information related to the one or more ring-related parameters 104 and/or other information, either directly (e.g., as schematically depicted by the arrow) or via the one or more networks. For example, the ring-related parameters 104 may be communicated directly via a hard-wired connection to the output device(s) 216, which may be an integral part of a device associated with one or more processors (e.g., the processors 204), may be located in the same general vicinity as the one or more processors (e.g., in the same room or the same building), or may be located remotely from the one or more processors, but in communication via a hard-wired connection. In some examples, the output device(s) 216 may include a hand-held device configured to be carried by a person. For example, the output device(s) 216 may include any computer device including a transceiver for sending and receiving signals, for example, via one or more networks. For example, the output device(s) 216 may be configured to display a user interface configured to display a representation of the ring-related parameters 104. In some examples, the ring-related parameters 104 may be communicated, either directly or via the one or more networks, to an output device at a service center, which may be, for example, a location at which the condition, operation, and/or maintenance of the internal combustion engine 100 may be monitored, or at which service and/or maintenance of the internal combustion engine 100 may be performed, such as, for example, a location associated with the manufacturer of the internal combustion engine 100, a machine carrying the internal combustion engine 100, and/or a location associated with a third party responsible for fulfilling a service and/or maintenance contract associated with the internal combustion engine 100.

Figure 3:
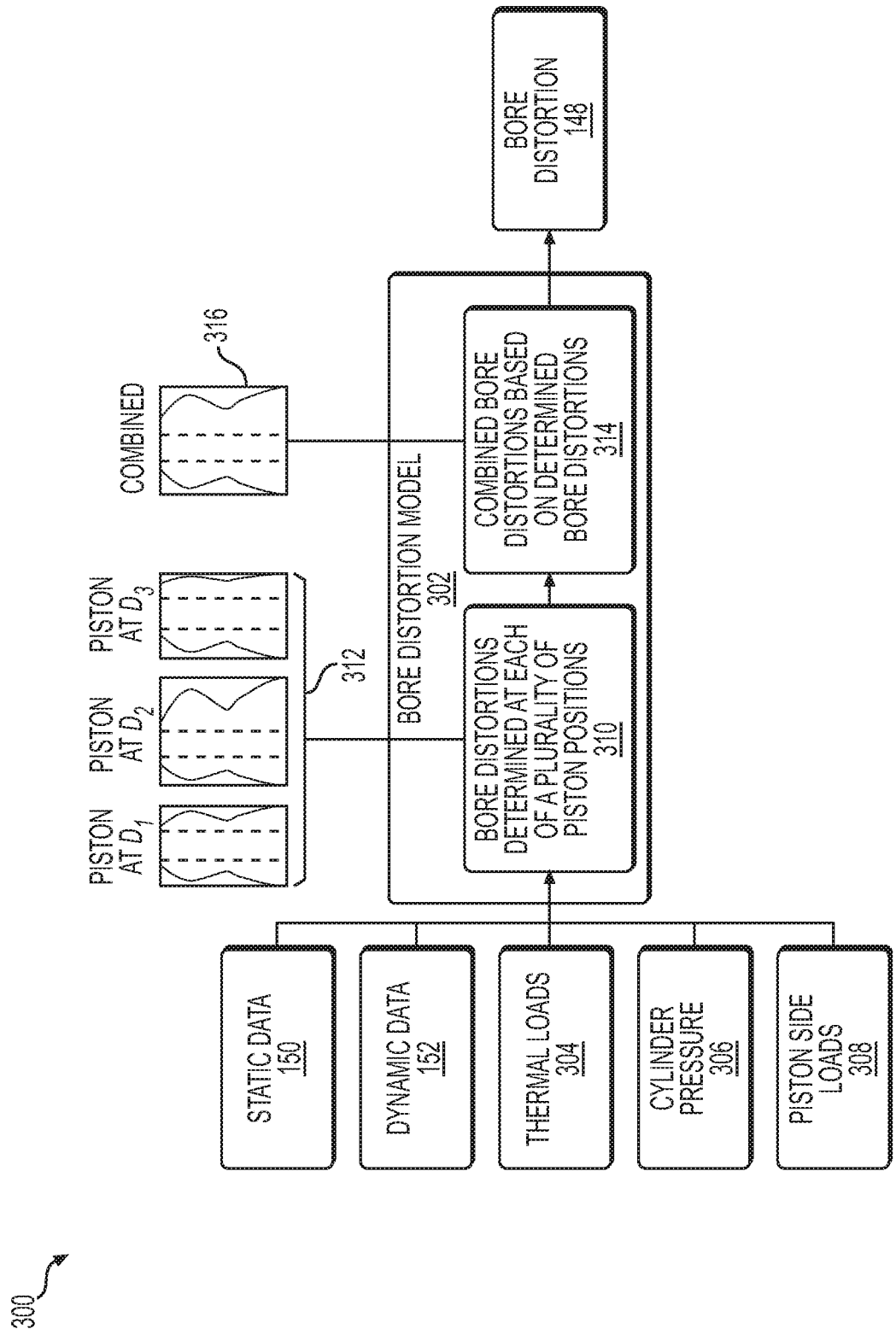
FIG. 3 is a block diagram of an example system for estimating bore distortion indicative of differences between a cross-sectional shape and a cross-sectional size of a cylinder bore of an internal combustion engine and an operational cross-sectional shape and an operational cross-sectional size of the cylinder bore during operation of the internal combustion engine.

FIG. 3 is a block diagram of an example system 300 for estimating bore distortion 148 indicative of differences between a cross-sectional shape and a cross-sectional size of a cylinder bore 110 of an internal combustion engine 100 and an operational cross-sectional shape and an operational cross-sectional size of the cylinder bore during operation of the internal combustion engine 100. In the example shown, the system 300 includes a bore distortion model 302 configured to estimate bore distortion 148 associated with operation of an internal combustion engine (e.g., actual operation and/or simulated operation). In some examples, the bore distortion model 302 may include an analytical model configured to estimate the bore distortion 148. In some examples, the analytical model may include a finite element analysis model, although other types of analytical models may be used. In some examples, the analytical model may include an analytical model trained, for example, via a machine learning engine configured to develop the bore distortion model 302. In some examples, such a machine learning engine may be part of the same processor(s) 204 shown in FIG. 2, and in some examples, the machine learning engine may be in one or more processors that are different from the one or more processor(s) 204.

For example, as shown in FIG. 3, static data 150, dynamic data 152, thermal loads 304, cylinder pressure 306, and/or piston sides loads 308 may be inputs to the bore distortion model 302. One or more of the static data 150, the dynamic data 152, the thermal loads 304, the cylinder pressure 306, and/or the piston sides loads 308 may be at least similar and/or derived from the corresponding parameters discussed with respect to FIGS. 1 and 2. At least some of such parameters may be measured and/or calculated in real-time, may be accessed from a database, and/or may be simulated via computer modeling. The bore distortion model 302 may, in some example examples, estimate the bore distortion 148, based at least in part on the parameters input into the bore distortion model 302. In some such examples, a machine learning engine may be used to train the bore distortion model 302, which may be configured to estimate the bore distortion 148. In some examples, the machine learning engine may be used to train the bore distortion model 302 via training data used as ground truth data, for example, correlating one or more of the parameters with the bore distortion 148. In some examples, the training data may include data associated with a plurality of previous interactions, and/or other feedback or interaction with the bore distortion model 302, such as, for example, the bore distortion 148 generated by the bore distortion model 302.

In some examples, confidence levels may be associated with the estimated bore distortion 148, and the confidence levels may provide an indication of the relative confidence of the accuracy of the estimated bore distortion 148. In some examples, the confidence levels may be communicated to an output device (e.g., output device(s) 216 in FIG. 2) for display with (or independent of) the bore distortion 148. In some examples, the machine learning engine may employ one or more algorithms, such as supervised learning algorithms (e.g., artificial neural networks, Bayesian statistics, support vector machines, decision trees, random forest, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

As shown in FIG. 3, in some examples, the bore distortion model 302 may be configured to receive one or more of the static data 150, the dynamic data 152, the thermal loads 304, the cylinder pressure 306, or the piston sides loads 308 and, at 310, determine bore distortions 312 (e.g., incremental bore distortions) at each of a plurality of piston positions D in the cylinder bore 110. For example, as shown in FIG. 3, the bore distortion model 302 may determine the bore distortion 312 at each of a plurality of positions D of the piston 116 in the cylinder bore 110, for example, at D1, D2, D3 . . . Dn. In some examples, the piston positions D may be correlated to crankshaft angles. In some examples, as shown in FIG. 3, at 314, the bore distortion model 302 may combine the bore distortions 312 determined at 310 to estimate the bore distortion 316, which may correspond to the bore distortion 148 shown in FIGS. 1 and 2, for example, as described herein. Thus, in some examples, the bore distortion 148 may include a plurality of bore distortions corresponding to a plurality of respective piston locations within the cylinder bore 110 during operation of the internal combustion engine 100 (e.g., during simulated and/or actual operation of the internal combustion engine 100).

For example, the bore distortion model 302, in at least some examples, may be configured to combine the plurality of operational cross-sectional shape segments and the plurality of operational cross-sectional size segments to define a bore distortion surface indicative of the bore distortion at least partially through at least one stroke of the piston 116 within the cylinder bore 110 (e.g., between bottom-dead-center and top-dead-center). For example, estimating the bore distortion 148 may include estimating a plurality of operational cross-sectional shapes and a plurality of operational cross-sectional sizes of the cylinder bore 110 at each of a plurality of crankshaft angles at least partially through at least one stroke of the piston 116 during operation of the internal combustion engine, and combining the plurality of operational cross-sectional shapes and the plurality of operational cross-sectional sizes to define a bore distortion surface for each of the plurality of crankshaft angles indicative of the bore distortion 148 at least partially through the at least one stroke.

For example, for a four-stroke internal combustion engine, the bore distortion 148 may be estimated through seven hundred-twenty degrees of crankshaft rotation and corresponding piston movement, for example, to account for differences in bore distortion through each of the intake stroke, the compression stroke, the expansion (or power) stroke, and the exhaust stroke. Due to differences in one or more of engine load, temperature, pressure, piston side load, etc., the bore distortion 148 may differ depending on the stroke of the internal combustion engine 100 and the position D of the piston 116 within the cylinder bore 110 during the respective strokes. In some examples, the bore distortion model 302 may be configured to account for at least some of such differences in order to provide a relatively more accurate bore distortion estimation. For a two-stroke internal combustion engine, the bore distortion 148 may be estimated through three hundred-sixty degrees of crankshaft rotation. Internal combustion engines operating according to different cycles are contemplated, and thus, in some examples, the bore distortion model 302 may be configured to account for at least some resulting differences of the cycles. In some examples, estimating the one or more ring-related parameters 104 may include estimating the one or more ring-related parameters 104 based at least in part on at least some of the bore distortion surfaces.

Figure 5:
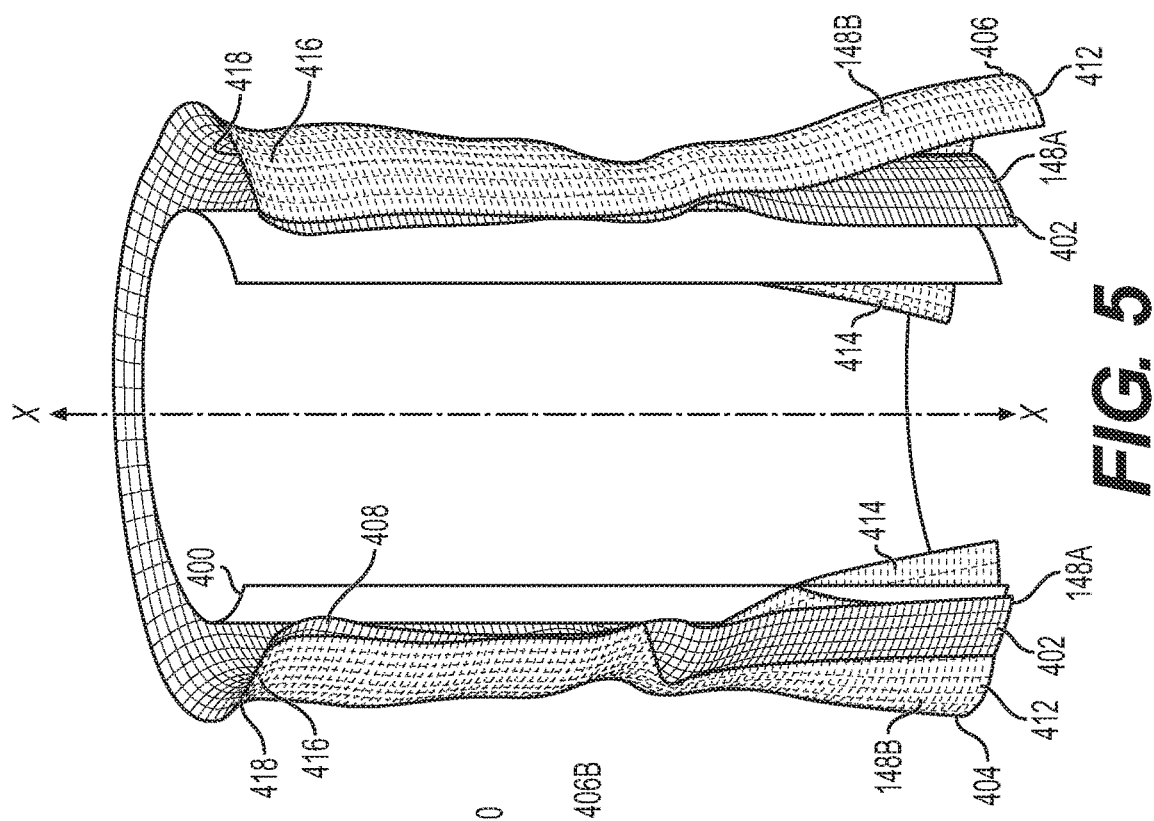
FIG. 5 is a perspective partial section view of the undistorted and distorted representations shown in FIG. 4.
Figure 4:
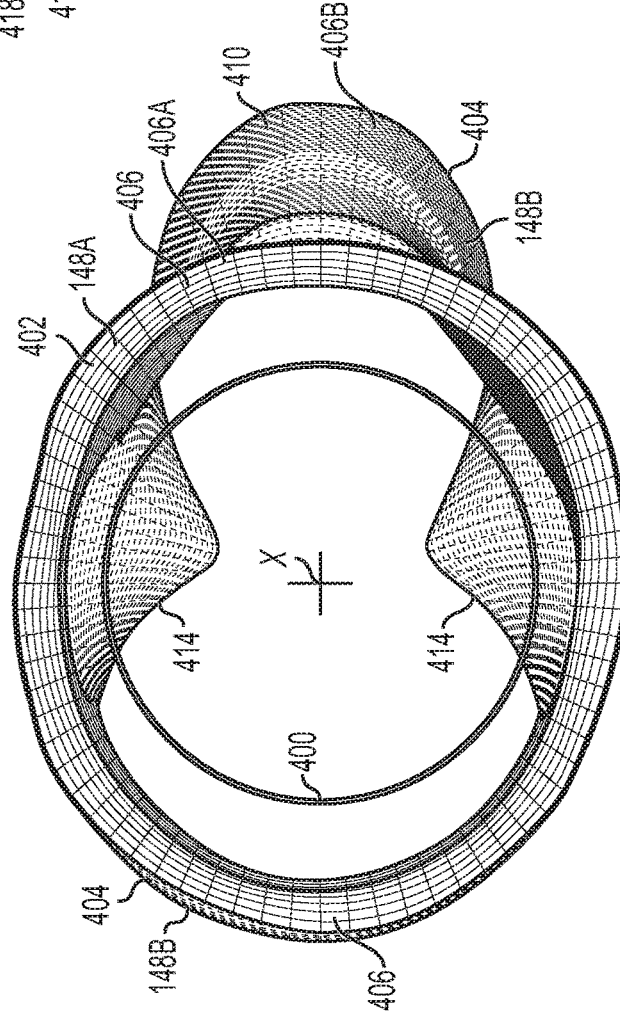
FIG. 4 is a top view including a representation of an example cross-sectional shape and a cross-sectional size of a cylinder bore in an undistorted condition along with two different representations of example bore distortion estimations, each including an operational cross-sectional shape and an operational cross-sectional size of the cylinder bore during operation of the internal combustion engine.

FIG. 4 and FIG. 5 are a top view and a perspective view, respectively, including a first representation 400 of an example cross-sectional shape and an example cross-sectional size of a cylinder bore 110 in an undistorted condition, along with second and third different representations 402 and 404 of example first and second estimated bore distortions 148A and 148B, respectively, each including an operational cross-sectional shape and an operational cross-sectional size of the cylinder bore 110 during operation of the internal combustion engine 100 (e.g., during simulated and/or actual operation). The second and third representations 402 and 404 of the estimated first and second bore distortions 148A and 148B are not to scale relative to the first representation 400 of the undistorted cylinder bore 110, but instead are shown in a manner that highlights example differences between the first representation 400 and the second and third representations 402 and 404. The second and third representations 402 and 404 of the respective estimated bore distortions 148A and 148B are depicted in a manner that highlights example differences between the first estimated bore distortion 148A and the second estimated bore distortion 148B, which are determined according to different example estimation processes discussed below.

As shown in FIG. 4, the first representation 400 shows an example cylinder bore 110 defining a substantially cylindrical inward facing surface having a substantially constant cross-sectional shape (e.g., circular) and substantially constant cross-sectional size, regardless of the longitudinal position D along the axis X of the cylinder bore 110. In contrast, the second representation 402 depicting the example first estimated bore distortion 148A, and the third representation 404 depicting the example second estimated bore distortion 148B, have a cross-sectional shape (see FIG. 4) and a cross-sectional size that vary with the longitudinal position D, resulting in the respective surfaces of the cylindrical bore 110 differing from the substantially cylindrical surface of the first representation 400.

For example, the first estimated bore distortion 148A and the second estimated bore distortion 148B may be determined using different estimation techniques. For example, the first estimated bore distortion 148A may be determined by using a finite element analysis technique that estimates the bore distortion 148A based at least in part on distortion of the cylinder bore 110 caused by (1) the average temperature during operation of the internal combustion engine 100 of a portion of the cylinder block 108 defining the cylinder bore 110 and (2) a compressive force on the cylinder block 108 caused by fasteners that secure the cylinder head to the cylinder block 108, but not based on, for example, any changes in the combustion chamber 128 resulting from operation, simulated or actual, of the internal combustion engine 100. For example, the first estimation of bore distortion 148A does not account for distortion caused by changing conditions during the intake stroke, changing conditions during the compression stroke, changing conditions during the expansion or power stroke, and/or changing conditions during the exhaust stroke. Such changing conditions may include, for example, change in pressure in the combustion chamber 128, change in thermal loads in the combustion chamber 128, change in temperature in the combustion chamber 128, and/or changing piston side loads during one or more of the piston strokes. In contrast, in some examples, the second estimated bore distortion 148B may be determined via a bore distortion model 302 that estimates the second bore distortion 148B based at least in part on one or more of the following: distortion of the cylinder bore 110 caused by the temperature during operation of the internal combustion engine 100 of a portion of the cylinder block 108 defining the cylinder bore 110, a compressive force on the cylinder block 108 caused by fasteners that secure the cylinder head to the cylinder block 108, any of one or more changes in the combustion chamber 128 resulting from operation, simulated or actual, of the internal combustion engine 100, such as, for example, changing conditions during the intake stroke, changing conditions during the compression stroke, changing conditions during the expansion or power stroke, and/or changing conditions during the exhaust stroke. Such changing conditions may include, for example, change in pressure in the combustion chamber 128, change in thermal loads in the combustion chamber 128, change in temperature in the combustion chamber 128, and/or changing piston side loads during one or more of the piston strokes. In some examples, the bore distortion model 302 may estimate the bore distortion (e.g., the incremental bore distortion) at each of a plurality of longitudinal positions D along the length of at least a portion of the cylinder bore 110, for example, for one or more of the strokes of the piston 116 within the cylinder bore 110. In some examples, the bore distortions for each of the plurality of estimations may be combined to estimate the second bore distortion 148B, and in some examples, the resulting second estimated bore distortion 148B may be different for one or more of the strokes of the piston 116 within the cylinder bore 110. In at least some examples, the second estimated bore distortion 148B may be relatively more accurate than the first estimated bore distortion 148B.

As shown in FIGS. 4 and 5, the first estimated bore distortion 148A includes a lateral distortion 406A resulting in the cylinder bore 110 having a substantially oval-shaped cross-section relative to the first representation 400 of the undistorted cylinder bore 110. In the example shown, the first lateral distortion 406A increases at the upper end 408A of the cylinder bore 110. In contrast, relative to the example first estimated bore distortion 148A, the example second estimated bore distortion 148B includes a more pronounced second lateral distortion 406B extending from one lateral end 410 of the second estimated bore distortion 148B, which is more pronounced at the lower end 412 of the second estimated bore distortion 148B (see FIG. 5). In addition, the example second estimated bore distortion 148B also includes inwardly extending distortions 414 at the lower end 412 of the second estimated bore distortion 148B, which are largely absent from the first estimated bore distortion 148A. Similar to the example first estimated bore distortion 148A, the example second estimated bore distortion 148B includes a flared distortion 416 at the upper end 418 of the second estimated bore distortion 148B. Other differences (and/or other similarities) are contemplated between the first estimated bore distortion 148A and the second estimated bore distortion 148B. In some examples, there may be significant differences between the first estimated bore distortion 148A and the second estimated bore distortion 148B, for example, due to differences between the methods for estimating the first and second bore distortions 148A and 148B.

Figure 6:
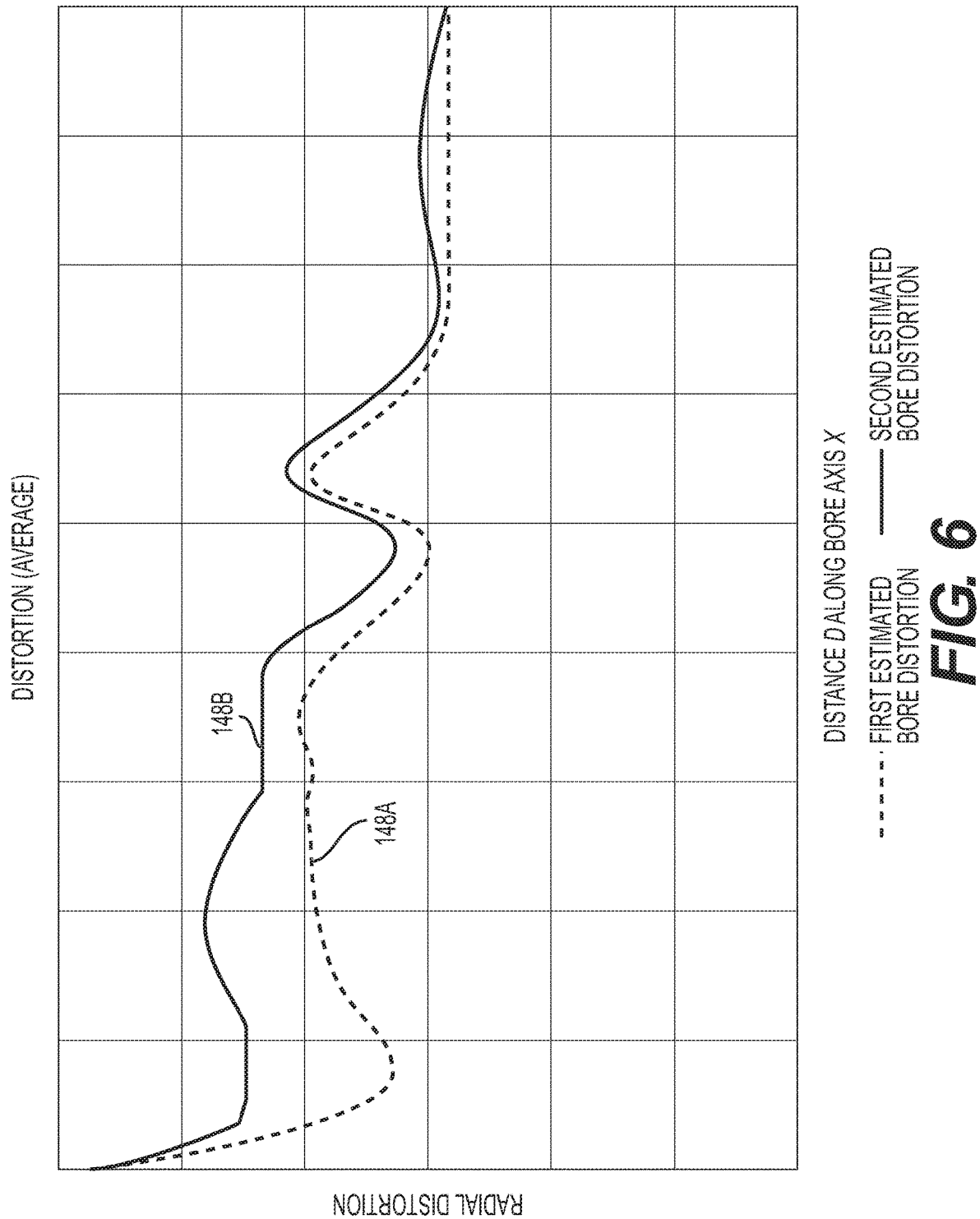
FIG. 6 is a graph showing two example bore distortion estimations as a function of position along a length of a cylinder.

FIG. 6 is a graph 600 showing the example first and second bore estimations 148A and 148B as a function of the position D along the length of the cylinder bore 110. The example first and second bore estimations 148A and 148B are each shown as an average around the circumference of the cylinder bore 110 (e.g., the first and second estimated bore distortions 148A and 148B may be different at different at different circumferential positions around the circumference of the cylindrical bore 110, for example, as shown in FIG. 4). As shown in FIG. 6, the first and second estimated bore distortions 148A and 148B may have similar profiles, but the example second estimated bore distortion 148B has, in general, a greater magnitude of distortion than the example first estimated bore distortion 148A.

Figure 7:
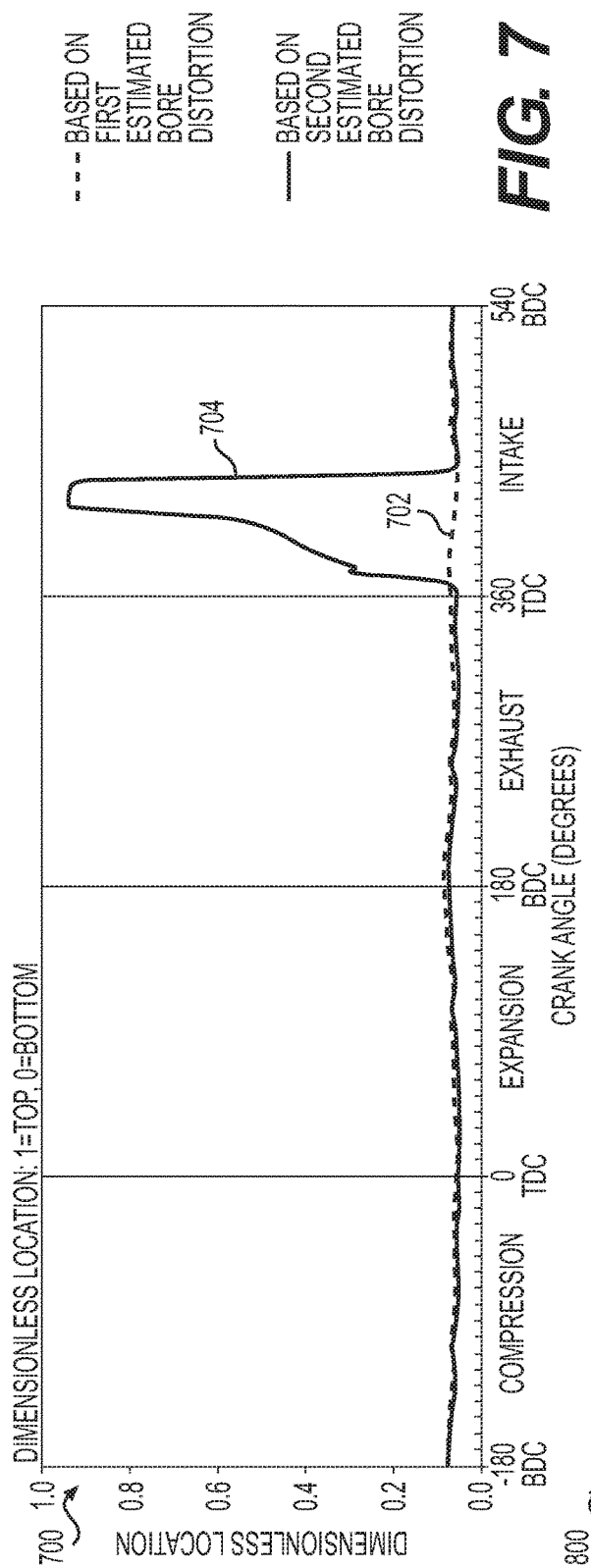
FIG. 7 is a graph showing first and second example ring-to-groove profiles for a first piston ring inside diameter based on a first estimated bore distortion and a second estimated bore distortion, respectively, as a function of crankshaft rotation.
Figure 8:
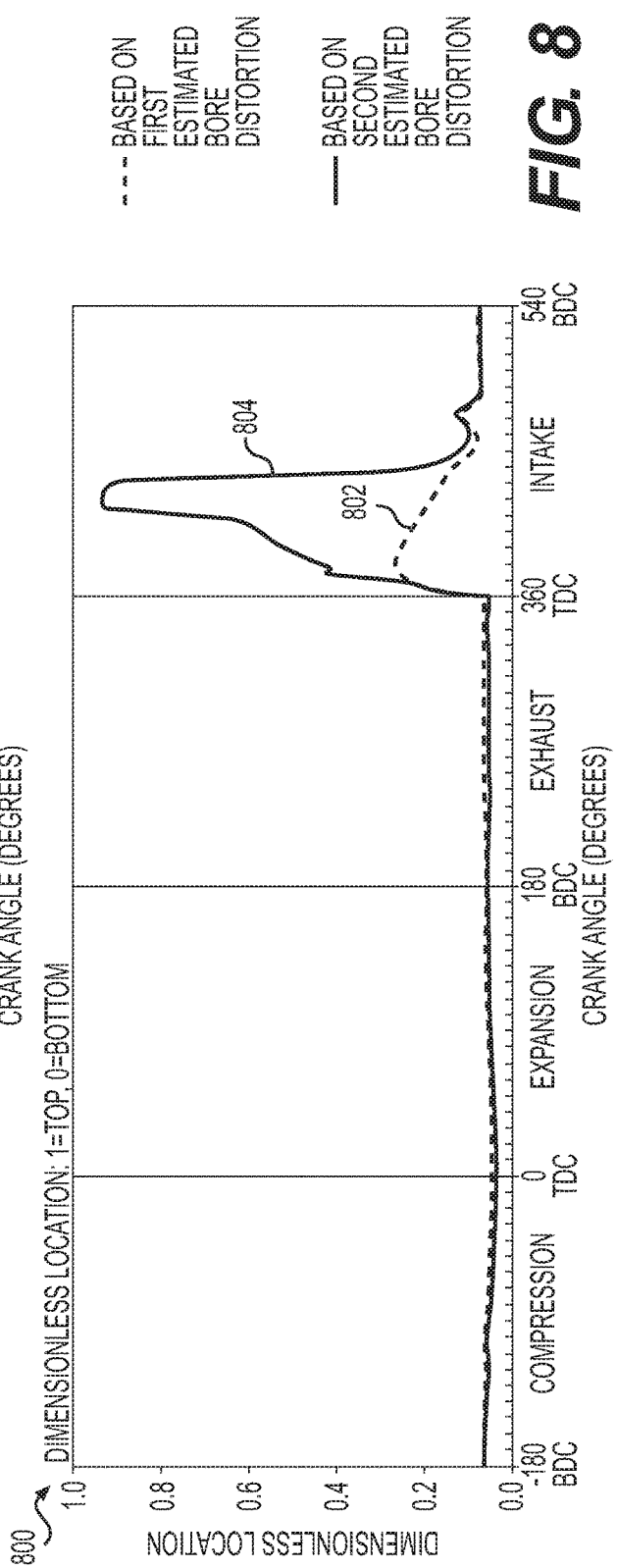
FIG. 8 is another graph showing first and second example ring-to-groove profiles for a first piston ring outside diameter based on a first estimated bore distortion and a second estimated bore distortion, respectively, as a function of crankshaft rotation.

FIG. 7 is a graph 700 showing a first example ring-to-groove profile 702 and a second example ring-to-groove profile 704 for a first piston ring (e.g., the first piston ring 140) inside diameter based on a first estimated bore distortion 148A and a second estimated bore distortion 148B, respectively, as a function of crankshaft rotation. FIG. 8 is a graph 800 showing a first example ring-to-groove profile 802 and a second example ring-to-groove profile 804 for a first piston ring (e.g., the first piston ring 140) outside diameter based on the first estimated bore distortion 148A and the second estimated bore distortion 148B, respectively, as a function of crankshaft rotation. In some examples, one or more of the ring-to-groove profiles 702 or 802 may be estimated via the ring-performance model 146 based at least in part on the first estimated bore distortion 148A, and one or more of the ring-to-groove profiles 704 or 804 may be estimated via the ring-performance model 146 based at least in part on the second estimated bore distortion 148B. As shown in FIG. 7, the graph 700 indicates that the axial location of the first ring inner diameter calculated using the first estimated bore distortion 148A is not indicative of as much upward movement during the intake stroke relative to the piston groove as compared to the axial location of the first ring inner diameter calculated using the second estimated bore distortion 148B. Similarly, as shown in FIG. 8, the graph 800 indicates that the axial location of the first ring outer diameter calculated using the first estimated bore distortion 148A is not indicative of as much upward movement during the intake stroke relative to the piston groove as compared to the axial location of the first ring outer diameter calculated using the second estimated bore distortion 148B. In some instances, this movement may be an important ring-related parameter.

Figure 9:
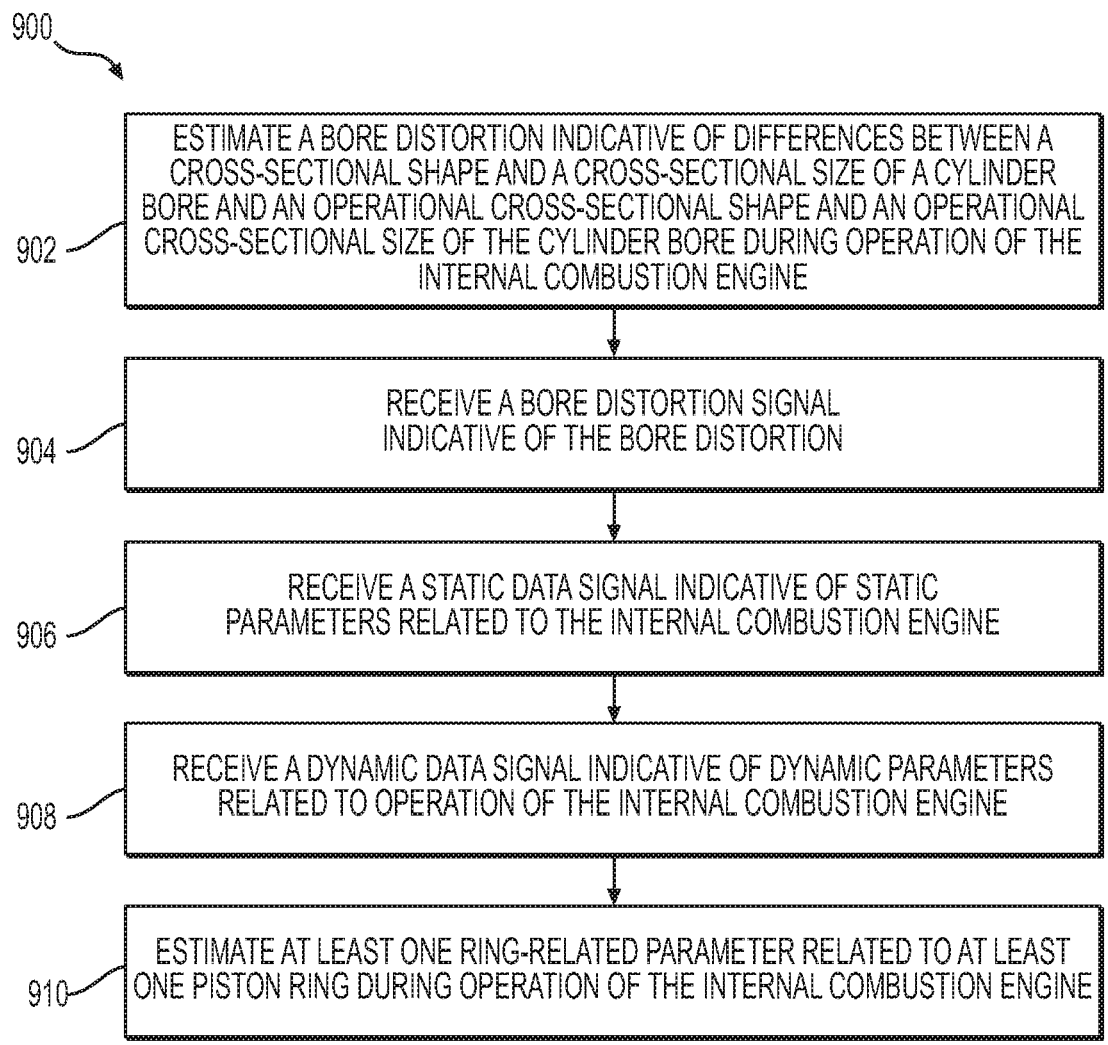
FIG. 9 is a block diagram of an example process for estimating one or more ring-related parameters related to one or more piston rings during operation of an internal combustion engine.

FIG. 9 illustrates an example process 900 for estimating at least one ring-related parameter related to at least one piston ring during operation of an internal combustion engine. This process 900 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process.

FIG. 9 illustrates a flow diagram of an example process 900 for estimating at least one ring-related parameter related to at least one piston ring during operation of an internal combustion engine. The example process 900, at 902, may include estimating a bore distortion indicative of differences between a cross-sectional shape and a cross-sectional size of a cylinder bore and an operational cross-sectional shape and an operational cross-sectional size of the cylinder bore during operation of the internal combustion engine. For example, a system for estimating bore distortion may include a bore distortion model configured to receive a static data signal indicative of static parameters related to the internal combustion engine, a dynamic data signal indicative of dynamic parameters related to operation of the internal combustion engine, a thermal load signal indicative of thermal loads associated with operation of the internal combustion engine, a cylinder pressure signal indicative of pressure in a cylinder bore of the internal combustion engine during operation, and/or a piston side load signal indicative of a piston side load associated with operation of the internal combustion engine. Based on one or more of the received signals, the bore distortion model may be configured to determine a bore distortion associated with operation of the internal combustion engine, for example, as described herein.

In some examples, estimating at least one ring-related parameter related to at least one piston ring during operation of the internal combustion engine may include estimating the operational cross-sectional shape and the operational cross-sectional size of the cylinder bore for each of a plurality of crankshaft angles at least partially through at least one stroke of a piston to determine a plurality of operational cross-sectional shape segments and a plurality of operational cross-sectional size segments. For example, estimating the bore distortion may include additionally include combining the plurality of operational cross-sectional shape segments and the plurality of operational cross-sectional size segments to define a bore distortion surface indicative of the bore distortion at least partially through the at least one stroke. In some examples, estimating the bore distortion may also include combining the plurality of operational cross-sectional shapes and the plurality of operational cross-sectional sizes to define a bore distortion surface for each of the plurality of crankshaft angles indicative of the bore distortion at least partially through the at least one stroke. In some examples, estimating the bore distortion may include estimating the operational cross-sectional shape and the operational cross-sectional size of the cylinder bore for each of a plurality of crankshaft angles through at least two strokes of the piston (e.g., through at least four strokes of the piston).

The example process 900, at 904, may include receiving a bore distortion signal indicative of the bore distortion. For example, a system for estimating ring-related parameters may include a ring performance model configured to estimate one or more ring-related parameters associated with operation of the internal combustion engine. In some examples, the ring performance model may be in communication with the bore distortion model and may receive the bore distortion signal, for example, from the bore distortion model, either directly or indirectly via a network.

At 906, the example process 900 may include receiving a static data signal indicative of static parameters related to the internal combustion engine. For example, the static parameters may include, for example, dimensions of at least one component of the internal combustion engine, material-related properties of at least one component of the internal combustion engine, and/or lubricant-related properties. In some examples, the ring performance model may receive the static data signal, for example, from a user input device and/or from the bore distortion model.

The example process 900, at 908, may also include receiving a dynamic data signal indicative of dynamic parameters related to operation of the internal combustion engine. For example, the dynamic parameters may include, for example, operating conditions associated with operation of the internal combustion engine and/or a pressure and/or a temperature associated with operation of the internal combustion engine. In some examples, the ring performance model may receive the static data signal, for example, from a user input device and/or from the bore distortion model.

At 910, the example process 900 may include estimating the at least one ring-related parameter related to the at least one piston ring during operation of the internal combustion engine. For example, the ring performance model may be configured to estimate ring friction, ring wear, blowby, oil consumption, and/or at least one ring force, for example, based at least in part on the bore distortion, the static parameters, and/or the dynamic parameters. In some examples, the ring performance parameters may be estimated throughout a range of crankshaft angles and/or longitudinal piston positions with the cylinder bore. For example, the ring performance parameters may be estimated through a single piston stroke, a double piston stroke, or through four piston strokes or more.

INDUSTRIAL APPLICABILITY

The systems and methods described herein may be used for estimating ring-related parameters related to piston rings during either actual or simulated operation of an internal combustion engine. Ring-related parameters may include, but are not limited to, ring friction, ring wear, blowby, oil consumption, and/or forces to which the rings are subjected during operation of the internal combustion engine. In some examples, the ring-related parameters may be estimated using a computer-based model configured to simulate operation of at least a portion of an internal combustion engine. Estimating ring-related parameters may be useful for designing components and/or controlling aspects associated with operation of an internal combustion engine, for example, to improve performance, improve efficiency, and/or reduce emissions.

In some examples, the systems and methods may be used to estimate a bore distortion associated with cylinder bores of the internal combustion engine. Estimating the bore distortion, in at least some examples, may improve the accuracy of estimating the ring-related parameters, for example, because the bore distortion may affect clearance between the respective piston rings and the cylinder bore, which, in turn, may affect, for example, compression, ring friction, ring wear, blowby, oil consumption, etc., during operation of the internal combustion engine.

In some examples, the internal combustion engine, simulated or actual, may include a cylinder block defining cylinder bores having a cross-sectional shape (e.g., a substantially constant circular shape) and a cross-sectional size (e.g., a substantially constant cross-sectional size) in a direction substantially perpendicular to a longitudinal axis of the respective cylinder bores. In some examples, the cross-sectional size and the cross-sectional shape of the cylinder bore may define in the longitudinal direction, in a substantially undistorted condition, a substantially cylindrical inward-facing surface. During operation of an internal combustion engine, the cylinder bores may distort, resulting in differences between the cross-sectional shape and the cross-sectional size of the cylinder bore (e.g., in a substantially undistorted condition) and an operational cross-sectional shape and an operational cross-sectional size of the cylinder bore during operation of the internal combustion engine, for example, as modeled by a computer-based model. Such distortion of the cylinder bores may affect the ring-related parameters estimated according to at least some examples of the systems and methods described herein. In some examples, the systems and methods may be used to estimate the bore distortion, and the bore distortion estimation may include a combination of a plurality of bore distortions corresponding to a plurality of respective piston locations within the cylinder bore during operation of the internal combustion engine. Estimating the bore distortion according to at least some examples described herein may result in improved accuracy of the estimation of the ring-related parameters.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A computer-implemented method for determining at least one ring-related parameter related to at least one piston ring during operation of an internal combustion engine, the internal combustion engine comprising: a cylinder block defining a cylinder bore having a cross-sectional shape and a cross-sectional size in a direction substantially perpendicular to a longitudinal axis of the cylinder bore, and a piston associated with the piston ring, the piston configured to move between a plurality of piston locations within the cylinder bore, the computer-implemented method comprising:

determining an individual three-dimensional bore distortion of the cylinder bore corresponding to each location of the plurality of piston locations, each individual bore distortion indicating the cross-sectional shape and the cross-sectional size of the cylinder bore along substantially an entire length of the cylinder bore;

determining an estimated three-dimensional bore distortion of the cylinder bore by combining the individual bore distortions, the estimated bore distortion being indicative of respective differences between (1) the cross-sectional shape and an operational cross-sectional shape of the cylinder bore during operation of the internal combustion engine, and (2) the cross-sectional size and an operational cross-sectional size of the cylinder bore during operation of the internal combustion engine;

generating image data indicating:
        a representation of the cylinder bore having the cross-sectional shape and the cross-sectional size, and
        a representation of the estimated bore distortion of the cylinder;

causing display of the image data;

determining, using a ring performance model, at least one ring-related parameter related to at least one piston ring during operation of the internal combustion engine, the ring performance model being configured to determine the at least one ring-related parameter based at least in part on:
        a bore distortion signal indicative of the estimated bore distortion;
        a static data signal indicative of static parameters related to the internal combustion engine; and
        a dynamic data signal indicative of dynamic parameters related to the operation of the internal combustion engine.

2. The computer-implemented method of claim 1, wherein determining the estimated bore distortion comprises:

determining the operational cross-sectional shape and the operational cross-sectional size of the cylinder bore for each of a plurality of crankshaft angles at least partially through at least one stroke of the piston to determine a plurality of operational cross-sectional shape segments and a plurality of operational cross-sectional size segments.

3. The computer-implemented method of claim 2, wherein determining the estimated bore distortion further comprises combining the plurality of operational cross-sectional shape segments and the plurality of operational cross-sectional size segments to define a bore distortion surface indicative of the estimated bore distortion at least partially through the at least one stroke.

4. The computer-implemented method of claim 1, wherein determining the estimated bore distortion comprises:

determining a plurality of estimated operational cross-sectional shapes and a plurality of estimated operational cross-sectional sizes of the cylinder bore at each of a plurality of crankshaft angles at least partially through at least one stroke of the piston during operation of the internal combustion engine; and combining the plurality of estimated operational cross-sectional shapes and the plurality of estimated operational cross-sectional sizes to define a bore distortion surface for each of the plurality of crankshaft angles indicative of the estimated bore distortion at least partially through the at least one stroke.

5. The computer-implemented method of claim 1, wherein determining the estimated bore distortion comprises determining the operational cross-sectional shape and the operational cross-sectional size of the cylinder bore for each of a plurality of crankshaft angles through at least two strokes of the piston.

6. The computer-implemented method of claim 1, wherein the static parameters comprise at least one of dimensions of at least one component of the internal combustion engine, material-related properties of at least one component of the internal combustion engine, or lubricant-related properties.

7. The computer-implemented method of claim 1, wherein the dynamic parameters comprise at least one of combustion chamber pressure, combustion chamber temperature, combustion chamber thermal load, or piston side load associated with operation of the internal combustion engine.

8. The computer-implemented method of claim 1, wherein determining the at least one ring-related parameter related to the at least one piston ring during operation of the internal combustion engine comprises determining at least one of ring friction, ring wear, blowby, oil consumption, or at least one ring force.

9. The computer-implemented method of claim 1, further comprising:

determining an operating parameter for controlling the internal combustion engine based at least in part on the at least one ring-related parameter; and generating a confidence level associated with the estimated bore distortion.

10. A non-transitory computer-readable storage medium having computer-executable instructions stored thereupon which, when executed by a computer, cause the computer to:

determine, for a plurality of respective piston locations within a cylinder bore, an individual three-dimensional bore distortion of the cylinder bore,
        the cylinder bore being defined by a cylinder block of an internal combustion engine, and having a cross-sectional shape and a cross-sectional size, and
        each individual bore distortion indicating the cross-sectional shape and the cross-sectional size along substantially an entire length of the cylinder bore;

determine an estimated three-dimensional bore distortion of the cylinder bore by combining the individual bore distortions, the estimated bore distortion being indicative of differences between the cross-sectional shape and the cross-sectional size of the cylinder bore and an operational cross-sectional shape and an operational cross-sectional size of the cylinder bore during operation of the internal combustion engine;

receive a bore distortion signal indicative of the estimated bore distortion;

receive a static data signal indicative of static parameters related to the internal combustion engine;

receive a dynamic data signal indicative of dynamic parameters related to operation of the internal combustion engine;

determine at least one ring-related parameter, associated with combustion in the cylinder bore during operation of the internal combustion engine, based at least in part on the estimated bore distortion, the static parameters, or the dynamic parameters;
determining an operational parameter of the internal combustion engine, or a second internal combustion engine, based at least in part on the at least one ring-related parameter; and
controlling the internal combustion engine or the second internal combustion engine based at least in part on the operational parameter.

11. The non-transitory computer-readable storage medium of claim 10, wherein determining the estimated bore distortion comprises determining the operational cross-sectional shape and the operational cross-sectional size of the cylinder bore for each of a plurality of crankshaft angles at least partially through at least one stroke of a piston to determine a plurality of operational cross-sectional shape segments and a plurality of operational cross-sectional size segments.

12. The non-transitory computer-readable storage medium of claim 11, wherein determining the estimated bore distortion further comprises combining the plurality of operational cross-sectional shape segments and the plurality of operational cross-sectional size segments to define a bore distortion surface indicative of the bore distortion at least partially through the at least one stroke.

13. The non-transitory computer-readable storage medium of claim 10, wherein determining the estimated bore distortion comprises:
determining a plurality of operational cross-sectional shapes and a plurality of operational cross-sectional sizes of the cylinder bore at each of a plurality of crankshaft angles at least partially through at least one stroke of a piston during operation of the engine; and
combining the plurality of operational cross-sectional shapes and the plurality of operational cross-sectional sizes to define a bore distortion surface for each of the plurality of crankshaft angles indicative of the bore distortion at least partially through the at least one stroke.

14. The non-transitory computer-readable storage medium of claim 13, wherein determining the at least one ring-related parameter comprises determining the at least one ring-related parameter based at least in part on at least some of the bore distortion surfaces.

15. The non-transitory computer-readable storage medium of claim 10, wherein determining the estimated bore distortion comprises determining the operational cross-sectional shape and the operational cross-sectional size of the cylinder bore for each of a plurality of crankshaft angles through at least two strokes of a piston.

16. A system for estimating at least one ring-related parameter related to at least one piston ring during operation of an internal combustion engine, the system comprising at least one processor configured to:
cause execution of a ring performance model configured to dynamically estimate at least one ring-related parameter related to the at least one piston ring during operation of the internal combustion engine, the ring performance model configured to:
receive a plurality of bore distortion signals indicative of bore distortion, the plurality of bore distortion signals corresponding to movement of a piston, associated with the piston ring, between a plurality of piston locations within a cylinder bore of the internal combustion engine, the cylinder bore having a cross-sectional shape and a cross-sectional size,
determine, based on the plurality of bore distortion signals, an individual three-dimensional bore distortion of the cylinder bore corresponding to each location of the plurality of piston locations, each individual bore distortion indicating the cross-sectional shape and the cross-sectional size along substantially an entire length of the cylinder bore,
determine an estimated three-dimensional bore distortion of the cylinder bore by combining the individual bore distortions, the estimated bore distortion being indicative of differences between (1) the cross-sectional shape and an operational cross-sectional shape of the cylinder bore during operation of the internal combustion engine, and (2) the cross-sectional size and an operational cross-sectional size of the cylinder bore during operation of the internal combustion engine,
receive a static data signal indicative of static parameters related to the internal combustion engine,
receive a dynamic data signal indicative of dynamic parameters related to the operation of the internal combustion engine, and
determine at least one ring-related parameter related to the at least one piston ring during operation of the internal combustion engine based at least in part on at least one of the estimated bore distortion, the static parameters, or the dynamic parameters; and
cause execution of a bore distortion model configured to generate a first three-dimensional representation of the estimated bore distortion and a second three-dimensional representation of the cylinder bore with the cross-sectional size and the operational cross-sectional.

17. The system of claim 16, wherein determining the estimated bore distortion comprises determining the operational cross-sectional shape and the operational cross-sectional size of the cylinder bore for each of a plurality of crankshaft angles at least partially through at least one stroke of the piston to determine a plurality of operational cross-sectional shape segments and a plurality of operational cross-sectional size segments.

18. The system of claim 17, wherein determining the estimated bore distortion further comprises combining the plurality of operational cross-sectional shape segments and the plurality of operational cross-sectional size segments to define a bore distortion surface indicative of the estimated bore distortion at least partially through the at least one stroke.

19. The system of claim 16, wherein determining the estimated bore distortion comprises:
determining a plurality of operational cross-sectional shapes and a plurality of operational cross-sectional sizes of the cylinder bore at each of a plurality of crankshaft angles at least partially through at least one stroke of the piston during operation of the engine; and
combining the plurality of operational cross-sectional shapes and the plurality of operational cross-sectional sizes to define a bore distortion surface for each of the plurality of crankshaft angles indicative of the estimated bore distortion at least partially through the at least one stroke.

20. The system of claim 16, wherein the bore distortion model is trained by a machine learning engine, using training data that includes: bore distortions generated by the bore distortion model, and ground truth data.

* * * * *